UNITED STATES PATENT OFFICE.

HENRY L. KOHLER, OF ST. LOUIS, MISSOURI.

CLAY-BINDER AND PROCESS OF MAKING SAME.

1,312,853.

Specification of Letters Patent.

Patented Aug. 12, 1919.

No Drawing.

Application filed March 24, 1919. Serial No. 284,854.

*To all whom it may concern:*

Be it known that I, HENRY L. KOHLER, a citizen of the United States, residing at St. Louis, State of Missouri, have invented certain new and useful Improvements in Clay-Binders and Processes of Making Same, of which the following is a specification.

As well understood in the art, the plasticity of clays is their capacity to be molded into any required form without loss of cohesion, and depends in a large measure not only on the chemically combined and hygroscopic water contained in the clay, but on the fineness of the clay, and to some extent on the amount of alumina entering into its composition. This plasticity however disappears after baking even where the clay is powdered very finely. Clay should however possess sufficient bonding properties to permit not only of molding, but to allow for the necessary shrinkage in the baking operation without cracking or splitting. This precaution against cracking is all the more necessary in the case of fire brick, which as a rule is subjected to rapid alternations or changes of temperature while in service. In the manufacture of fire brick this cracking or splitting is avoided by first tempering the raw clay by exposure to the atmosphere before molding the same into bricks and also mixing it with other materials such as ground burnt fire clay, or "grog" (old ground up bricks). Unless the clay to which the burnt fire clay or grog is to be added has sufficient bonding properties it will not hold any considerable percentage of these materials and hence can not be used to advantage in the molding and burning operations in the manufacture of fire brick. The present invention is directed to the treatment of non-plastic clays in general, and to flint clays in particular, the object sought being not only to impart plasticity to the clay, but to impart thereto the necessary bonding properties which a fire clay should possess to be properly molded, and amalgamated with grog and burnt fire clay to insure the production of a serviceable non-fusible fire brick. As well understood in the art, sand ($SiO_2$) as an impurity influences the plasticity of clays unfavorably, whereas iron and lime alter it very little; and while a non-plastic clay such as flint-clay is on the whole purer than plastic clay, containing as it does a higher percentage of alumina and less free silica, the pressure of free silica therein destroys the bonding properties so essential to perfect molding and subsequent burning or baking. I have discovered that a basic salt of aluminum added to, or formed in the clay as a result of chemical reaction between the aluminum silicate of the clay and an aluminum salt of a mineral acid, or free acid, added to the clay in the wet state, not only forms an admirable binder for the clay so as to permit ready molding thereof and amalgamation with grog or burnt fire clay, but permits baking of the clay without danger of cracking or splitting. The basic salt referred to operates as a binder for the clay during the tempering and molding stage, said salt being gradually converted into the oxid (and silicate) during the burning or baking stage without losing its effectiveness as a binder. Besides acting as a binder it adds alumina to the clay thereby making a more neutral material, the alumina serving to lower, or entirely eliminate the free silica present by converting the latter into the silicate of aluminum. The manner of forming the binder in the clay mass may be described as follows:

For our purpose we may assume that the non-plastic or flint clay is in the main a hydrated silicate of aluminum with some free silica. To a given weight of finely powdered clay made wet with a sufficient quantity of water, I add from one-half to five per cent. of anhydrous aluminum sulfate ($Al_2(SO_4)_3$) in powdered form and thoroughly mix the same with the clay. The aluminum sulfate combining with the water crystallizes and in so crystallizing acts as a temporary binder, rendering the mass cohesive. The mixture is allowed to remain at ordinary atmospheric temperature (60-70 degrees Fahr.) for a sufficient length of time to bring about the conversion of the aluminum sulfate into a basis salt of aluminum, by the aluminum silicate of the clay, the reaction being substantially and approximately as follows:

$3Al_2O_3.2SiO_2 + 2Al_2(SO_4)_3 + XH_2O = 2Al_2SO_4(OH)_4 + Al_2(SO_4)_2(OH)_2 + 2Al_2SO_4(OH)_4 + 6H_2SiO_3 + XH_2O$ 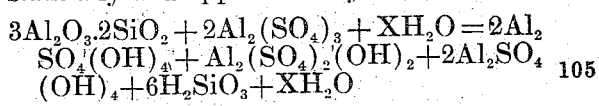

In the burning or baking operation (where the material is formed into bricks) these basic sulfates are converted into oxids, and a portion of the latter are converted into silicates either by the silicic acid set free in the reaction between the clay and aluminum salt, or by said acid and any free silica which may be present in the clay. At the baking temperature (red heat) the sulfur radical (SO₃) is simply driven off and the oxid of aluminum (Al₂O₃) remains behind. A portion of this oxid by reaction with the silicic acid, or free silica of the clay, or both, forms a silicate as follows:

$$Al_2O_3 + H_2SiO_3 + SiO_2 = Al_2O_3 \cdot 2SiO_2 + H_2O.$$

We thus have a baked clay comprising the silicate of aluminum of which the original body of clay is composed, with a binder composed of aluminum oxid and aluminum silicate resulting from the conversion of the basic sulfates into oxids at high temperature and from the reaction at such temperature between a portion of the oxid and the silicic acid thus formed, and the free silica usually present in the clay.

It will be seen from the foregoing that the basic salts of aluminum serve as a binder for the clay while the latter is being molded, thereby overcoming the non-plasticity of the original body of clay (flint or non-plastic clay); and that the oxid and silicate of aluminum resulting from the decomposition of the basic sulfates and the conversion of a portion thereof into the silicate at high temperature, serve in turn as a binder for the baked or burnt clay, the danger of cracking or splitting being thus wholly eliminated.

While I have here described the use of aluminum sulfate as the reagent to be added to the original clay mass to form the basic salts, it is to be understood that I do not wish to be restricted to this particular reagent. I may for example, where the clay is very pure, start with sulfuric acid, which, when added to the clay, converts the silicate of aluminum into the sulfate, this in turn by further reaction forming the basic sulfate. I may too, start with ammonium sulfate with like results. In fact any mineral acid or salt thereof capable of setting free the silicic acid of the aluminum silicate of the clay may be used in lieu of aluminum sulfate. An example of such equivalent would be aluminum nitrate or nitric acid. In practice, the aluminum sulfate (½ to 5 per cent. by weight) or its equivalent is added to a mixture of substantially two parts of finely ground burnt fire clay, or grog, and one part of the finely ground raw clay, this proportion making an excellent fire brick, though I may use other mixtures or even use the raw clay altogether. The latter may be used exclusively where the material is used as a cement or mortar and not baked into bricks. The percentage of aluminum salt (or equivalent reagent) added to the clay may be varied. It is given here as ranging from one-half to five per cent. by weight of the clay to which it is added. This however is only by way of example, as the quantity of salt or equivalent reagent used will depend on the fineness and degree of plasticity of the clay. The finer and less non-plastic clays require a smaller quantity of binder reagent than the coarser and more non-plastic variety. In the case of fine clays anywhere from one half to two per cent. of reagent will suffice; for coarser grades of clay a larger percentage of reagent is needed.

In the examples above cited the basic aluminum salt is formed by reaction within the mass of clay treated; but it is entirely within the scope of my invention to form such basic salt apart from the clay in any manner known to the art, and then add the salt (dissolved in water) to the clay, the basic salt whether added to the clay from without or whether formed by reaction in the body of the clay serving as a binder for the clay and rendering the same plastic for molding purposes.

The basic salt binder need not necessarily be exclusively a salt of aluminum, that is to say, the base of the compound employed as the reagent need not necessarily contribute the element aluminum to the basic salt resulting from the reaction, it being possible to employ a reagent having a base other than aluminum. If for example we add to the clay the required quantity or percentage of zirconium sulfate, the final reaction will result in a binding material comprising a mixture of the basic sulfates of zirconium and aluminum, the reason therefor being that the affinities of zirconium and aluminum for the sulfur radical are about the same, and their normal sulfate salts are isomorphous. The following is substantially the reaction when zirconium sulfate is employed as the reagent:—

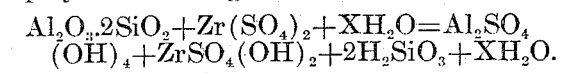
$$Al_2O_3 \cdot 2SiO_2 + Zr(SO_4)_2 + XH_2O = Al_2SO_4(OH)_4 + ZrSO_4(OH)_2 + 2H_2SiO_3 + XH_2O.$$

The foregoing example is cited merely to show that the portion of the basic salt derived from the reagent added to the charge of clay may have a base other than aluminum, and still serve its purpose as a binder. Of course zirconium sulfate would hardly do in practice owing to the high cost of this reagent, but its employment falls within the scope of my invention.

The binder here described is not restricted in its application to clays or silicates of aluminum, as the same may be applied to argillaceous material such as bauxite or the hydrate of aluminum (Al₂O₃·2H₂O). When added to bauxite, the aluminum sulfate (or its equivalent) likewise forms a basic salt or salts with the aluminum hydrate, serving as a binder for the bauxite at ordinary temperatures, the said binder being converted into an oxid of aluminum when the bauxite is baked, a portion of the oxid combining with the free silica of the bauxite when present (it usually is) and forming a silicate of aluminum.

To properly function as a binder-forming reagent, the acid of the compound added to the clay, be such acid free or in combination, must be sufficiently strong to dissociate the silicic acid from the aluminum silicate of the clay; otherwise the basic salts of the acid of the reagent will not form. For this reason organic acids or salts of organic acids (for example acetic acid or aluminum acetate) are not suitable, whereas mineral acids such as sulfuric acid or the sulfate of aluminum produce the desired result. The silicic acid thus released, in turn combines with the aluminum oxid resulting from the decomposition of the basic salt in the baking of the clay, forming therewith the silicate of aluminum, the free silica that may be present likewise participating in the reaction. The final product or fire brick is a pure silicate of aluminum reasonably free of sand or silica, with a binder of oxid and silicate of aluminum.

The term "clay" as used herein, and particularly in the claims, is to be given its broadest interpretation, the same including not only the silicates of aluminum, but the oxids and hydrates as well, or any combination of the three.

Having described my invention what I claim is:—

1. A body of clay having a binder comprising a basic sulfate of aluminum generated within the mass of the clay.

2. In the treatment of clays, the process consisting in mixing with the finely divided moist clay a quantity of a reagent containing an acid capable of dissociating the silicic acid from the aluminum of the clay, and continuing the reaction to permit the formation of the basic salts of aluminum in the clay mass.

3. In the treatment of clays, the process consisting in mixing with the finely divided wet clay a quantity of a reagent containing a mineral acid to decompose the silicate of aluminum of the clay, and continuing the reaction to form basic aluminum salts of said acid in the clay mass.

4. In the treatment of clays, the process consisting in mixing with the finely divided moist clay a quantity of a metal sulfate capable of decomposing the aluminum silicate of the clay, and continuing the reaction to form basic aluminum sulfate in the clay mass.

5. In the treatment of clays, the process consisting in mixing with the finely divided moist clay a quantity of aluminum sulfate to decompose the aluminum silicate of the clay, and continuing the reaction to form basic aluminum sulfate in the clay mass.

6. In the treatment of clays, the process consisting in mixing with the finely divided moist clay a quantity of a reagent containing an acid capable of dissociating the silicic acid from the aluminum of the clay, containing the reaction to form basic aluminum salts of the reagent acid, and heating the clay to convert said basic salts into the oxid of aluminum.

7. In the treatment of clays, the process consisting in mixing with the finely divided clay a predetermined quantity of a reagent containing an acid capable of dissociating the silicic acid from the aluminum of the clay, continuing the reaction to form basic aluminum salts of the reagent acid, heating the clay to convert said basic salts into aluminum oxid and causing said oxid or a portion thereof to combine with the silicic acid or free silica present to form a silicate of aluminum.

8. In combination with a mass of moist non-plastic clay, a binder comprising a basic salt of an acid capable of decomposing the aluminum silicate of the clay, said salt being convertible into an oxid serving as a binder for the clay at baking temperature.

9. In combination with a mass of moist non-plastic clay, a binder comprising a basic sulfate of aluminum.

10. In the treatment of clays containing free silica, the process consisting in adding to the finely divided moist clay a suitable quantity of a salt binder containing an acid capable of decomposing the silicate of aluminum of the clay, burning or baking the clay to convert the binder into an oxid, and causing the oxid to combine with the free silica and form a silicate of the base of said salt.

11. A clay moistened to be molded comprising a silicate of aluminum, and a binder of a basic salt of aluminum.

12. In combination with a body of clay, a binder comprising a basic salt of aluminum.

13. In combination with a body of clay, a binder comprising a basic sulfate of aluminum.

In testimony whereof I affix my signature, in presence of two witnesses.

HENRY L. KOHLER.

Witnesses:
EMIL STOREK,
ELSE M. SIEGEL.

It is hereby certified that in Letters Patent No. 1,312,853, granted August 12, 1919, upon the application of Henry L. Kohler, of St. Louis, Missouri, for an improvement in "Clay-Binders and Processes of Making Same," an error appears in the printed specification requiring correction as follows: Page 1, line 57, for the word "pressure" read *presence;* and that the said Letters Patent should be read with this correction therein that the same may conform to the record of the case in the Patent Office.

Signed and sealed this 21st day of October, A. D., 1919.

[SEAL.]

M. H. COULSTON,
*Acting Commissioner of Patents.*

Cl. 106—10.